(12) United States Patent
Elferich et al.

(10) Patent No.: US 7,573,729 B2
(45) Date of Patent: Aug. 11, 2009

(54) RESONANT POWER LED CONTROL CIRCUIT WITH BRIGHTNESS AND COLOR CONTROL

(75) Inventors: Reinhold Elferich, Aachen (DE); Peter Lürkens, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 61 days.

(21) Appl. No.: 10/578,650

(22) PCT Filed: Nov. 5, 2004

(86) PCT No.: PCT/IB2004/052320

§ 371 (c)(1),
(2), (4) Date: May 9, 2006

(87) PCT Pub. No.: WO2005/048658

PCT Pub. Date: May 26, 2005

(65) Prior Publication Data

US 2007/0080652 A1    Apr. 12, 2007

(30) Foreign Application Priority Data

Nov. 13, 2003   (EP)   .................................. 03104184

(51) Int. Cl.
*H02M 3/335* (2006.01)
(52) U.S. Cl. .................... 363/21.02; 315/210; 315/211; 315/212; 315/224; 315/291

(58) Field of Classification Search ................. 315/210, 315/212, 224, 225, 226, 246, 247, 250, 254, 315/276, 283, 291, 307, 308, 211, 294; 363/15–21.04
See application file for complete search history.

(56) References Cited

U.S. PATENT DOCUMENTS

| | | | | |
|---|---|---|---|---|
| 5,053,937 | A * | 10/1991 | Blockl | 363/16 |
| 5,615,093 | A * | 3/1997 | Nalbant | 363/25 |
| 6,359,392 | B1 * | 3/2002 | He | 315/291 |
| 6,510,995 | B2 * | 1/2003 | Muthu et al. | 235/454 |
| 6,826,059 | B2 * | 11/2004 | Bockle et al. | 363/17 |
| 7,178,971 | B2 * | 2/2007 | Pong et al. | 315/291 |
| 2002/0043611 | A1 | 4/2002 | Yoshikawa et al. | 250/208.1 |
| 2002/0186026 | A1 * | 12/2002 | Elferich | 324/652 |
| 2003/0112229 | A1 * | 6/2003 | Pong et al. | 345/204 |

FOREIGN PATENT DOCUMENTS

EP   0 314 324 A1   5/1989

* cited by examiner

*Primary Examiner*—Douglas W Owens
*Assistant Examiner*—Ephrem Alemu

(57) ABSTRACT

The invention relates to a resonant power LED control circuit for the independent, simultaneous brightness and color or color temperature control of two LEDs (41, 42) or two groups of LEDs, comprising a single resonant converter which is essentially formed from a half or full bridge DC/AC converter (2) with a control unit (21), a resonant capacitor, and a transformer (3).

19 Claims, 5 Drawing Sheets

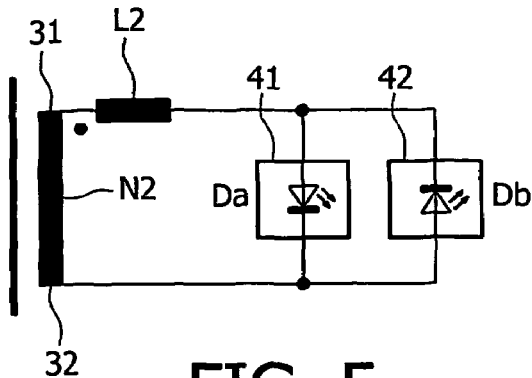
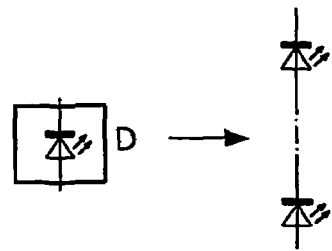
FIG. 5  FIG. 6
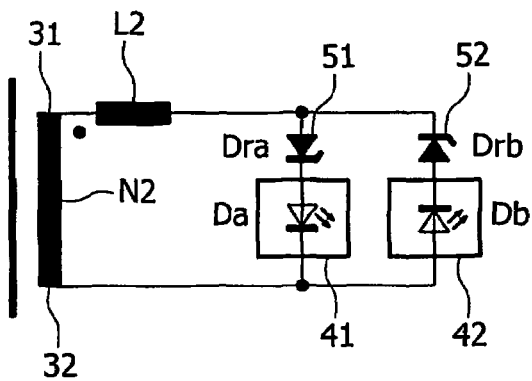
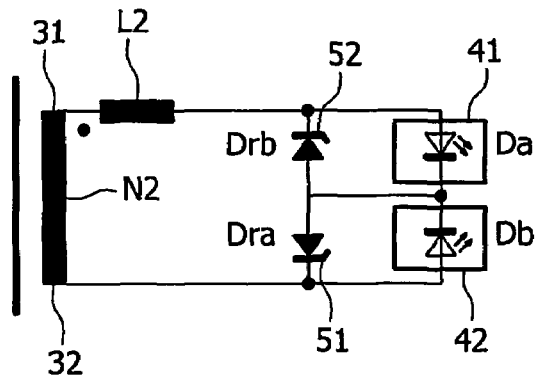
FIG. 7  FIG. 8
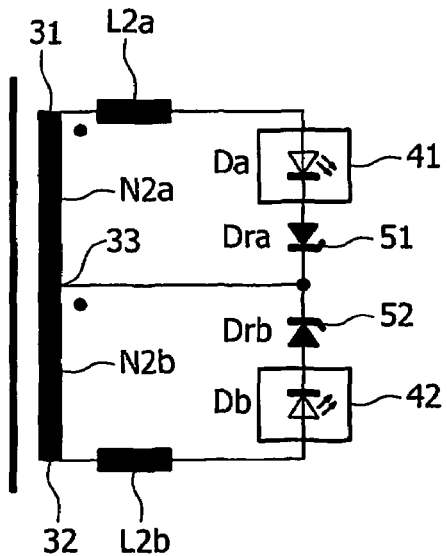
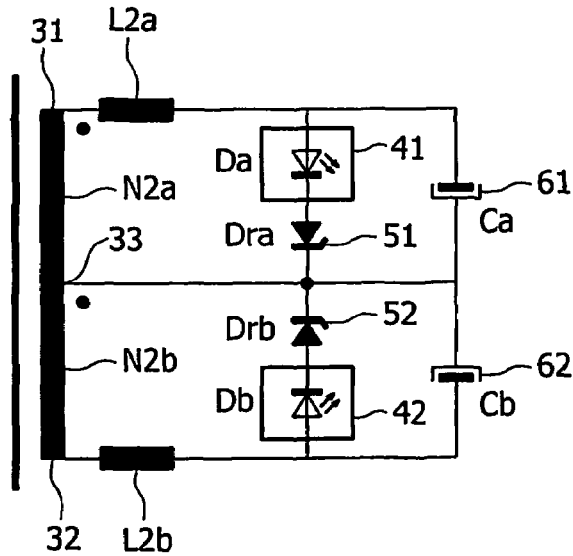
FIG. 9  FIG. 10

RESONANT POWER LED CONTROL CIRCUIT WITH BRIGHTNESS AND COLOR CONTROL

The use of light-emitting diodes in display devices is known. Light-emitting diodes were limited to this field of application for a long time because of their initially small light output. Recently, however, light-emitting diodes have become increasingly available which have a sufficient light output which also fulfills requirements of lighting applications. Usually a plurality of light-emitting diodes is arranged into a matrix. The most powerful LEDs known at the moment are denoted "power LEDs". Their light output is a multiple of that of incandescent lamps. The control of the LEDs typically takes place by means of a constant current source, such that the current flowing through the diodes is detected and is controlled to a given required value. The possibility is given here to dim the light-emitting diode by pulse width modulation. If the envisaged advantages of the LEDs as regards their functionality and size are to be utilized, an LED control is necessary which is cost-efficient at the same time. It is the task of the control to fulfill the substantial lighting requirements as regards brightness and color or color temperature.

US 2003/0043611 A1 discloses a circuit arrangement for the power supply and control of the operation of light-emitting diodes which renders possible a brightness control of said diodes. A DC/AC converter which is connected to a DC voltage source and has a variable output frequency is used in combination with at least two controllable power switches for the purpose of converting the supply voltage delivered by the DC voltage source into an AC voltage. A load circuit is connected to the output of the DC/AC converter, which circuit comprises a resonance member and contains the light-emitting diode. The switching frequency of the power switches of the load circuit is variable for the purpose of controlling the brightness of the light-emitting diode. The LEDs (with or without rectifier) may be directly connected to the resonant circuit, which is supplied by a frequency-modulated half or full bridge for brightness control.

EP 0 314 324 A1 discloses an oxymeter system which comprises an LED power supply consisting of a full bridge inverter which is directly connected to two LEDs connected in antiparallel, said LEDs having different emission frequencies. The inverter is modulated such that each LED is operated with a different, fixedly set frequency.

Further known systems have in common that a two-stage voltage converter is preferred for the control of the brightness of one LED or several LEDs connected in series (in contrast to the two single-stage systems described above). A first AC/DC converter supplies the required LED DC voltage (for example from the mains voltage), and a second one forms the pulse width modulated current source. Several such DC/AC converters are necessary for controlling the color through mixing of the light from several LEDs. This leads to a considerable constructional size in dependence on the number of colors. Furthermore, the known systems are found to be cost-intensive because of their constructional complexity.

It is an object of the invention to remedy this. The invention has for its object to provide a resonant control for power LEDs with brightness and color control in which the number of components is reduced and the constructional size is small. According to the invention, this object is achieved by means of a resonant power LED control which comprises a single resonant converter for the simultaneous, independent brightness and color control of two LEDs or two groups of LEDs, which converter is formed substantially from a half or full bridge DC/AC converter with a control unit, a resonant capacitor, and a transformer.

The invention provides a resonant control for power LEDs with brightness and color control in which the number of components is reduced and whose constructional size is small. The use of a single resonant converter, substantially consisting of a DC/AC converter, a resonant capacitor, and a transformer, for two LEDs or for two groups of LEDs (two or more groups being provided, two of which are independently controlled), and the number of components that is clearly reduced thereby at the same time lead to a cost reduction.

In a further embodiment of the invention, the light emitted by the diodes forms an input value for the control unit, such that the input signal representing the input value is achieved by means of an optical coupling. The emitted light will thus follow two reference signals at the primary side of the DC/AC converter and thus becomes independent of temperature or ageing.

Alternatively, the currents at the secondary side which are to be associated with the two LEDs or groups of LEDs to be controlled may be measured and fed back.

In an embodiment of the invention, several LEDs are joined together into groups of arrays connected in series each time. As a result, a wide variety of LED configurations can be controlled in dependence on the specific lighting requirements.

In a further embodiment of the invention, the voltage supply of the LEDs takes place via the secondary side of the transformer. Thus the latter may comprise only a single winding, to which the two LEDs (or groups of LEDs) are connected in antiparallel. As a result, the two LEDs (or groups of LEDs) are supplied in succession, i.e. the first one by the first (positive) half wave of the secondary transformer current, and the second LED (group) by the second (negative) half wave thereof. The respective currents can be controlled independently through adjustment of the duty cycle and a frequency of the DC/AC converter at the primary side. In the case of strongly differing forward voltages of the two LEDs (or groups of LEDs, which may consist, for example, of different numbers of LEDs connected in series), the secondary side of the transformer may also be formed from two windings which may be adapted to the forward voltages. The winding directions of these windings is chosen such that again—in conjunction with the way of connecting to the LEDs (or groups of LEDs)—the LEDs (groups) are consecutively supplied. Such a basic configuration arises, for example, through the use of a winding with a central tap which is connected to a common cathode (or anode) of the two LEDs (groups) and whose ends are connected to the anodes (or cathodes) of the two LEDs (groups).

In a further embodiment of the invention, a further LED (or group of LEDs) is arranged in the common branch leading to the central tap. The full current flows in this branch, i.e. the LED (group) arranged here is supplied by both half waves of the transformer output current. In this case, the LED (group) present in the common branch serves as a main light source, while the other two LEDs (groups) each supplied by only a half wave serve as subsidiary light sources.

In a further embodiment of the invention, a switching diode is provided instead of one of the LEDs (groups) supplied by a half wave. This results in an arrangement with a main and a subsidiary light source. It is possible here to adjust the currents through the two LEDs (groups) independently of one another, so that the total brightness and—through the use of LEDs (groups) of different colors—the color or color temperature of the mixed light can be independently controlled.

Advantageously, the LEDs are connected to reverse blocking diodes. A reverse breakdown of the LEDs is avoided thereby. Furthermore, a possible blocking delay current of the LEDs is avoided.

In a preferred further embodiment, the LEDs are connected to filter capacitors. The ratio of the peak value to the rms value of the LED current can be reduced thereby.

The invention will be explained by way of example below with reference to the FIGS., in which:

FIG. 1 diagrammatically shows a power LED control;

FIG. 5 shows an output configuration with only one winding;

FIG. 6 shows the series arrangement of LEDs;

FIG. 7 shows a configuration as in FIG. 5 with additional reverse blocking diodes (series arrangement);

FIG. 8 shows a configuration as in FIG. 5 with additional reverse blocking diodes (parallel arrangement);

FIG. 9 shows a central tap of the control according to FIG. 1 with reverse blocking diodes;

FIG. 10 shows a configuration as in FIG. 9 with additional filter capacitors;

Figure 1:
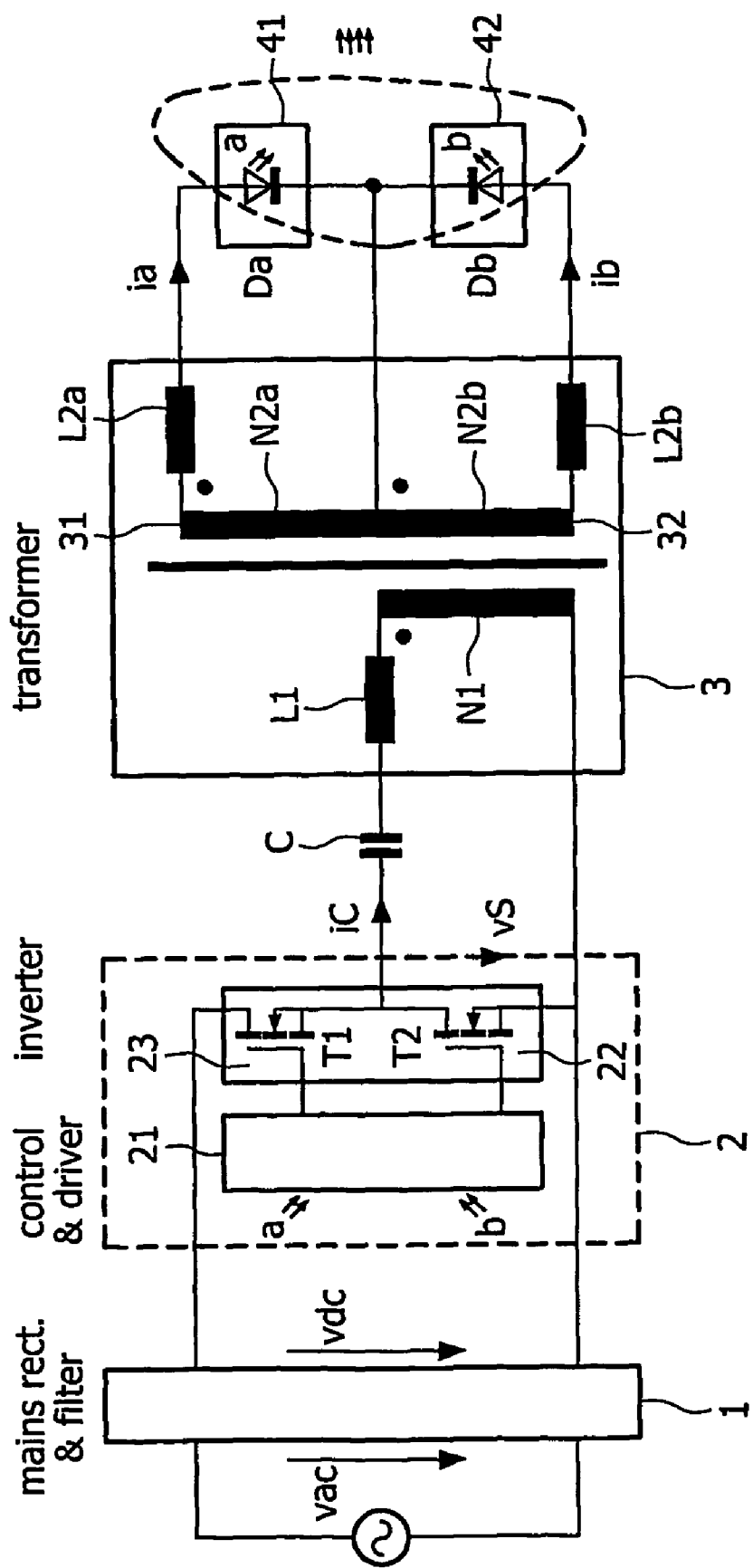

FIG. 1 diagrammatically shows the construction of a power LED control according to the invention. A rectifier and a filter 1 are connected to a supply network operated with an alternating voltage vac. The direct voltage vdc present at the output of the rectifier 1 supplies a DC/AC converter 2 to which a transformer 3 is connected. A capacitor C is connected in series between the DC/AC converter 2 and the transformer 3. The capacitor and transformer together form a resonant circuit. The transformer 3 excites the LEDs 41, 42.

The DC/AC converter 2 is essentially based on a control 21 to which two transistors 22, 23 arranged in a half bridge circuit are connected. Alternatively, the DC/AC converter may also be constructed as a full bridge circuit. The control 21 is optically connected to the LEDs 41, 42 at its input. Alternatively, the currents at the secondary side, associated with the half waves, may be measured and fed back. To convert the light emitted by the LEDs 41, 42 into electrical signals, the control 21 comprises photosensors (not shown). The cathodes of the LEDs 41, 42 are directly connected at the secondary side to the central tap 33 of the transformer 3.

The two output voltages, which are derived via respective inductances L2a and L2b between the connections 31 and 32 on the one hand and the central tap 33 on the other hand, may be adjusted so as to adjust the specific forward voltage of the LED and to control the individual brightness thereof by way of the current thereof In the preferred case, the inductances L2a, L2b are transformer (leakage) inductances. The LED 41 emits light of a first color, the LED 42 of a second color. Preferred colors are white (first half wave) and amber to orange (approximately 590 to 600 nm; other half wave) in this case. Instead of LED groups with only one color each, LEDs of different colors may be provided within the groups (for example, instead of only amber colored LEDs in one group also a mixture of red and green LEDs).

The respective output currents can be controlled independently of one another by means of the switching ratio of the primary side. The light is sent back to the half bridge control as an input signal. Alternatively, the currents at the secondary side, associated with the half waves, may be measured and fed back. This construction represents a simple feedback path, as is usual in network-insulated converters by means of optical couplers.

Figure 2:
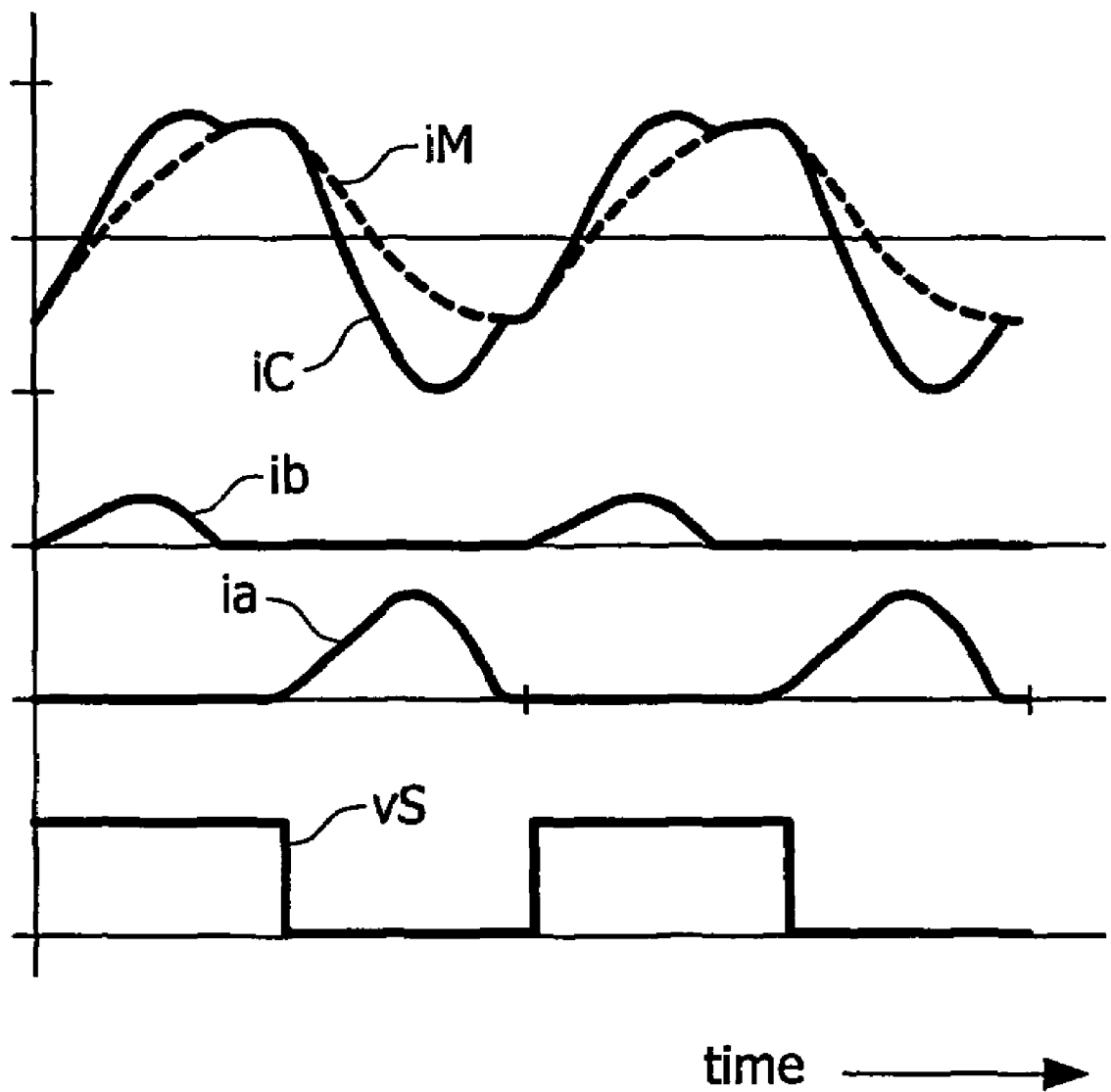
FIG. 2 shows the current and voltage gradient of the LED control of FIG. 1 during operation (both LEDs powered)
Figure 3:
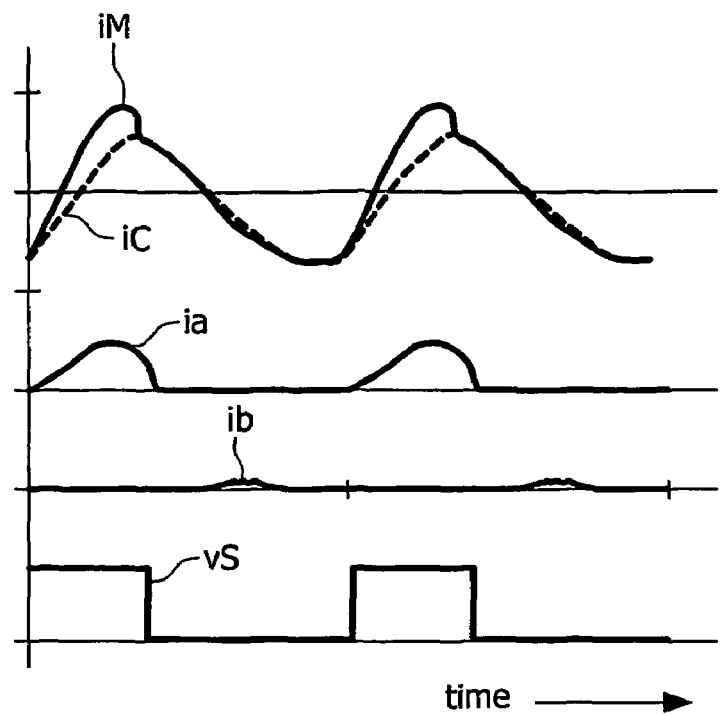
FIG. 3 shows the current and voltage gradient of the LED control of FIG. 1 (LED (Da) powered, duty factor of DC/AC converter 35%)
Figure 4:
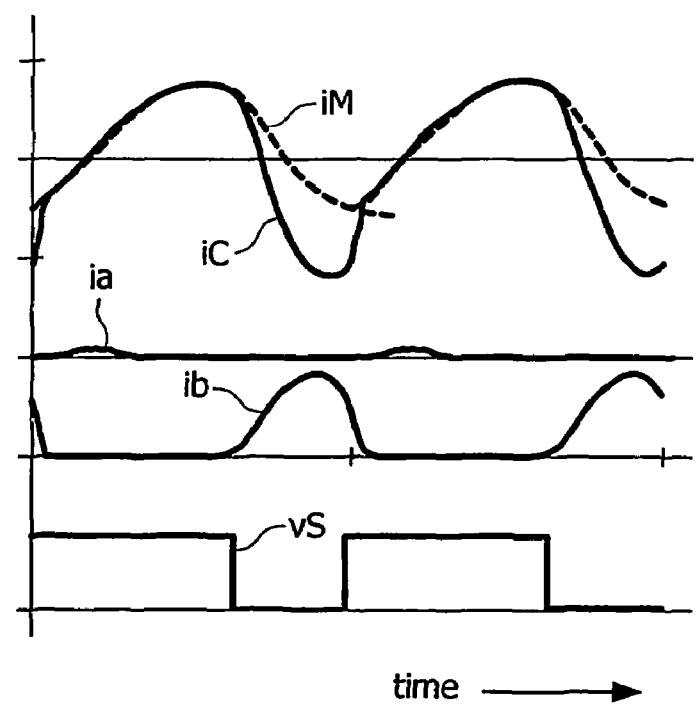
FIG. 4 shows the current and voltage gradient of the LED control of FIG. 1 (LED (Db) powered, duty cycle of DC/AC converter 65%)

The operating principle is shown in FIGS. 2 to 4 in the form of current and voltage gradients. As FIG. 2 shows, the DC/AC converter 2 operates in a symmetrical operational cycle of 50% at a given frequency by means of resonance. Both LEDs 41, 42 are excited. The two uppermost curves in FIG. 1 each give the DC/AC converter current iC and the magnetization current iM (not shown in FIG. 1) of the transformer, which arise as a result of the DC/AC converter operation in accordance with vS (lower curve) for two switching cycles in the stationary state. The two curves in the middle show the gradients of the associated currents through the LED 41 and LED 42, respectively. In the case of a positive output current of the transformer, i.e. the difference between iC and iM, this current will flow through the LED 41; the subsequent negative half wave of the transformer output current will then flow through the LED 42.

FIG. 3 shows a modified DC/AC converter operation. The gradient of the DC/AC converter voltage Vs here has a duty cycle reduced to 35% and a slightly increased frequency. As a result, the positive half wave of the transformer output current, i.e. the current through LED 41, remains approximately the same, whereas the current through LED 42 substantially disappears.

In FIG. 4, the DC/AC converter is operated with a duty cycle of 65%. Here the current through LED 42 is strongly pronounced, whereas the current through LED 41 is practically absent.

FIG. 5 shows an output configuration at the secondary side with only one winding N2. The LEDs 41, 42 are connected in antiparallel. Instead of the LED 41 or LED 42, a plurality of LEDs connected in series may alternatively be provided (cf. FIG. 6). Should the LED 41, 42 have a breakdown voltage close to or even below its forward voltage, or have a blocking delay behavior that cannot be neglected, the use of reverse blocking diodes 51, 52, preferably Schottky diodes, is possible (cf. FIGS. 7 and 8). FIGS. 9 and 10 show a configuration at the secondary side with two windings N2a, N2b. Filter capacitors 61, 62 may be additionally included (cf. FIG. 10) for reducing the ratio of peak to rms value of the LED current.

Figure 11:
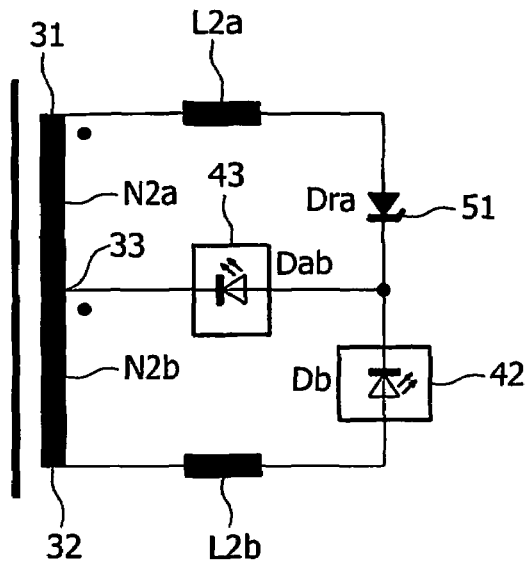
FIG. 11 shows a configuration with a main and a subsidiary light source.

FIG. 11 shows a configuration which renders possible an LED arrangement in which a first LED 43 is used as a main light source, excited by both half waves of the transformer output current, and a second LED 42 as a subsidiary light source, excited only by the negative half waves. Preferably, the LED group 43 is amber/orange in color, and the LED group 42 blue/cyan. The LED group 42 is essentially excited to a higher or lower degree through variation of the duty cycle, so that the color or color temperature of the resulting mixed light is changed, whereas a variation in the frequency essentially leads to a change in the output brightness.

Figure 13:
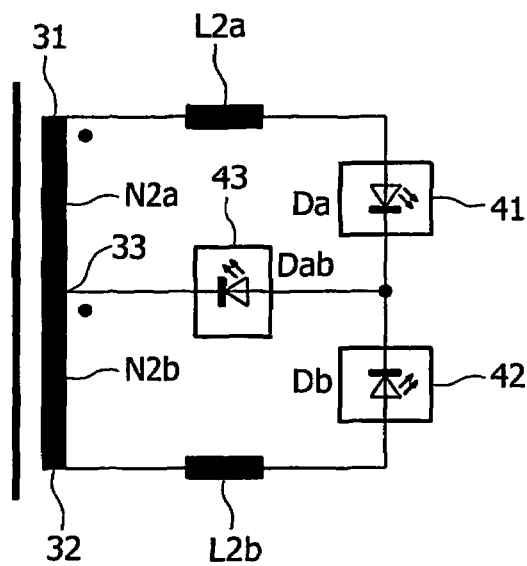
FIG. 13 shows a configuration as in FIG. 11 with a second subsidiary light source.

An additional LED 41 may be added to the circuit of FIG. 11 as a further subsidiary light source (cf. FIG. 13) so as to cover a wider color spectrum or color temperature range. This additional LED 41 is then excited only by the positive half waves, complementary to the LED 42. Preferred colors in this embodiment are red for the LED (group) 43 and cyan and green for the LEDs (groups) 41 and 42. This arrangement solves the problem that red LEDs available at present have a particularly high forward voltage rise over their operating current range (flat current-voltage characteristic) for technical reasons. The relevant topology here, however, is based on load-independent output voltages in the ideal case, which in its turn correspond to ideally steep diode characteristics. If a red LED (group), for example, is connected in a branch supplied by only a half wave, a limited controllability will arise under certain circumstances, because the voltage range required for the fill load variation cannot be achieved. This means that the LEDs either are never fully on or never fully off. In the arrangement described above, the LED group lies in the common branch whose voltage sweep is given by the frequency and not by the degree of asymmetry of the duty cycle. The required voltage sweep for the cyan and green group can be covered by the duty cycle variation.

Figure 12:
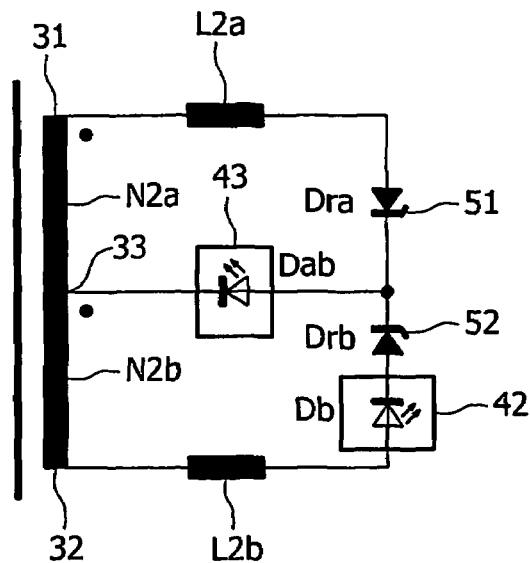
FIG. 12 shows a configuration as in FIG. 11 with reverse blocking diodes.
Figure 14:
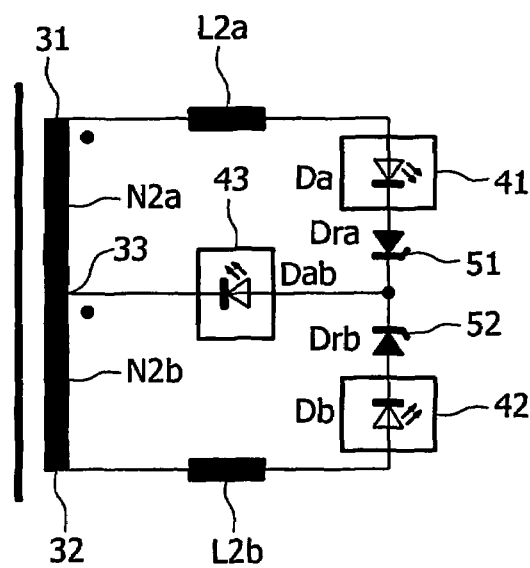
FIG. 14 shows a configuration as in FIG. 13 with reverse blocking diodes.

The circuits of FIGS. 11 and 13 may again be provided with reverse blocking diodes 51, 52 (cf. FIGS. 12 and 14).

LIST OF REFERENCE NUMERALS

1 rectifier
2 DC/AC converter
3 transformer
4 LEDs
41 LED
42 LED
43 LED
5 reverse blocking diodes
6 filter capacitors
21 control
22 transistor
23 transistor
31 terminal
32 terminal
33 central tap
51 reverse blocking diode
52 reverse blocking diode
61 filter capacitor
62 filter capacitor
L2$a$ inductance
L2$b$ inductance

The invention claimed is:

1. A resonant power LED control apparatus comprising a single resonant converter configured to provide simultaneous, independent brightness and color control of two LEDs or two groups of LEDs, wherein the converter comprises a half or full bridge DC/AC converter with a control unit, a resonant capacitor, and a transformer, wherein at least one first LED of the two LEDs or two groups of LEDs conducts a first current only during a positive half-cycle of a secondary voltage across at least one secondary winding of the transformer, and at least one second LED of the two LEDs or two groups of LEDs conducts a second current only during a negative half-cycle of the secondary voltage.

2. A resonant power LED control apparatus as claimed in claim 1, wherein each of the two LEDs or two groups of LEDs comprises several LEDs joined together into groups of arrays connected in senes.

3. A resonant power LED control apparatus as claimed in claim 1, wherein a voltage supply of the two LEDs or the two groups of LEDs takes place via the at least one secondary winding of the transformer.

4. A resonant power LED control apparatus as claimed in claim 1, wherein the two LEDs or the two groups of LEDs are connected to the at least one secondary winding in antiparallel.

5. A resonant power LED control apparatus as claimed in claim 4, wherein colors of the two LEDs or the two groups of LEDs comprise white and amber/orange.

6. A resonant power LED control apparatus as claimed in claim 1, wherein the two LEDs or the two groups of LEDs are connected to the at least one secondary winding of the transformer such that they are supplied with current in succession.

7. A resonant power LED control apparatus as claimed in claim 6, wherein the transformer comprises a central tap at a secondary side, the central tap being connected to a common anode or cathode of the two LEDs or the two groups of LEDs.

8. A resonant power LED control apparatus as claimed in claim 7, wherein a further LED is connected as a main light source between the central tap and the common cathode or anode of the two LEDs or the two groups of LEDs, wherein the two LEDs or the two groups of LEDs serve as subsidiary light source LEDs.

9. A resonant power LED control apparatus as claimed in claim 8, wherein a switching diode is used instead of one of the subsidiary light source LEDs.

10. An apparatus, comprising:
a transformer having a primary winding and at least one secondary winding;
at least one first light source coupled to the at least one secondary winding so as to conduct a first secondary current and thereby generate first light only during a positive half-cycle of a secondary voltage across the at least one secondary winding;
at least one second light source coupled to the at least one secondary winding so as to conduct a second secondary current and thereby generate second light only during a negative half-cycle of the secondary voltage;
a resonance circuit coupled to the primary winding for providing a resonance current through the primary winding; and
a controller coupled to the resonance circuit for providing to the resonance circuit at least one control signal having a variable duty cycle,
wherein:
the resonance current is based at least in part on the variable duty cycle of the at least one control signal; and
the variable duty cycle of the at least one control signal is based at least in part on at least one of a first feedback signal associated with the at least one first light source and a second feedback signal associated with the at least one second light source.

11. The apparatus of claim 10, wherein the first feedback signal and the second feedback signal are optical signals.

12. The apparatus of claim 10, wherein the first feedback signal comprises a first measured value of the first secondary current and the second feedback signal comprises a second measured value of the second secondary current.

13. The apparatus of claim 10, wherein each of the at least one first light source and the at least one second light source comprises a plurality of LEDs.

14. The apparatus of claim 10, further comprising at least one third light source coupled to the at least one secondary winding so as to conduct a third secondary current and thereby generate third light during both the positive half-cycle and negative half-cycle of the secondary voltage.

15. The apparatus of claim 14, wherein the third light source is a white LED.

16. The apparatus of claim 15, wherein the first light source is a red LED and the second light source is a blue LED.

17. An apparatus, comprising:

at least one first light source coupled to at least one secondary winding of a transformer so as to conduct a first secondary current and thereby generate first light only during a positive half-cycle of a secondary voltage across the at least one secondary winding;

at least one second light source coupled to the at least one secondary winding so as to conduct a second secondary current and thereby generate second light only during a negative half-cycle of the secondary voltage; and at least one third light source coupled to the at least one secondary winding so as to conduct a third secondary current and thereby generate third light during both the positive half-cycle and negative half-cycle of the secondary voltage.

18. The apparatus of claim 17, wherein the third light source is a white LED.

19. The apparatus of claim 18, wherein the first light source is a red LED and the second light source is a blue LED.

* * * * *